United States Patent [19]
Taylor-McCune et al.

[11] Patent Number: 5,800,702
[45] Date of Patent: Sep. 1, 1998

[54] HEAVY DUTY STRAINER

[75] Inventors: Christopher J. Taylor-McCune, Mission Viejo; Niculae G. Popescu, Glendora; William V. Stucker, La Mirada, all of Calif.

[73] Assignee: Shurflo Pump Manufacturing Co., Santa Ana, Calif.

[21] Appl. No.: 665,440

[22] Filed: Jun. 18, 1996

[51] Int. Cl.[6] .................................................. B01D 29/05
[52] U.S. Cl. .......................... 210/162; 210/232; 210/445; 210/446; 210/447; 210/451
[58] Field of Search .............................. 210/162, 232, 210/238, 435, 445, 446, 447, 448, 451, 452

[56] References Cited

U.S. PATENT DOCUMENTS

| | | | |
|---|---|---|---|
| 992,268 | 5/1911 | Schmidt | 210/246 |
| 1,514,979 | 11/1924 | MccMillin | |
| 2,178,240 | 10/1939 | Pascale | 210/445 |
| 2,722,316 | 11/1955 | Goscilo | 210/448 |
| 2,809,754 | 10/1957 | Pudlo | |
| 2,915,188 | 12/1959 | Baker | 210/447 |
| 3,085,689 | 4/1963 | Hering et al. | 210/445 |
| 3,173,865 | 3/1965 | Bosico | 210/452 |
| 3,502,220 | 3/1970 | Kohlberg | 210/452 |
| 3,502,221 | 3/1970 | Butterfield | |
| 3,681,562 | 8/1972 | Winzen | |
| 3,931,015 | 1/1976 | Jenkins | 210/455 |
| 4,009,714 | 3/1977 | Hammer | |
| 4,250,037 | 2/1981 | Kempa | |
| 4,341,538 | 7/1982 | Vadnay et al. | |
| 4,419,166 | 12/1983 | Larson | |
| 4,422,939 | 12/1983 | Sharp et al. | |
| 4,485,014 | 11/1984 | Gilroy et al. | |
| 4,582,605 | 4/1986 | Rea et al. | 210/447 |
| 4,609,459 | 9/1986 | Hendrix | 210/445 |
| 4,690,757 | 9/1987 | Mathus et al. | |
| 4,902,415 | 2/1990 | Lemonnier | |
| 5,139,672 | 8/1992 | Ohbayashi | 210/455 |
| 5,354,468 | 10/1994 | Richards | |

FOREIGN PATENT DOCUMENTS

| | | |
|---|---|---|
| 1453653 | 11/1965 | France . |
| 1960143 | 8/1967 | Germany . |
| 656209 | 8/1951 | United Kingdom . |
| 2035832 | 6/1980 | United Kingdom . |

Primary Examiner—Peter A. Hruskoci
Assistant Examiner—Betsey J. Morrison
Attorney, Agent, or Firm—Frank J. Uxa

[57] ABSTRACT

A new raw water strainer includes a body having a closed first end and an open second end and defining a chamber therebetween. The chamber has a central axis intersecting the first and second ends. An inlet is provided including an inlet passage in fluid communication with the chamber. An outlet, spaced apart from the inlet, is also provided and includes an outlet passage in fluid communication with the chamber. A cover is included which is sized and adapted to be secured to the body to close the open second end. A screen assembly having first and second sides positioned in the chamber at an angle of about 45° or less relative to the central axis is located so that it is between the inlet and the outlet. A basket assembly is provided which is sized and adapted to be removably placed in the chamber and to carry the screen assembly.

16 Claims, 2 Drawing Sheets

HEAVY DUTY STRAINER

BACKGROUND OF THE INVENTION

The present invention relates to strainers used to remove debris from flowing fluid streams. More particularly, the invention relates to such strainers useful in heavy duty applications, such as in raw water systems for boats, and the like.

Boats, for example, ocean going vessels, often employ raw water, for example, raw sea water, for various purposes, such as cleaning, bathing and the like. Before the raw water is used, it is often passed through a strainer to remove debris.

Prior art raw water strainers have tended to have relatively bulky configurations, which is disadvantageous because space is always at a premium on a boat. In addition, previous strainers have been relatively difficult to open and close, often requiring tools or requiring more than one wrist rotation (about 180°). Strainers which are difficult to open and close are particularly disadvantageous in choppy sea conditions. Also, previous strainers often require relatively frequent cleaning to maintain effectiveness and/or are relatively difficult to repair or maintain.

It would be advantageous to provide new strainers which address one or more of the shortcomings of prior art strainers.

Summary of the Invention

New heavy duty strainers, such as raw water strainers for use on boats and the like, have been discovered. The present strainers have configurations which allow installation in relatively small areas and/or in a relatively large number of different locations, and allow increased access for maintenance. In addition, the present strainers are relatively easy to open and close, for example, not requiring hand repositioning or tools, and include parts which are not easily dropped or misplaced. The present strainers preferably have a positive stop, and more preferably an audible "click", to alert the user that the cover for the strainer is securely closed. This avoids uncertainty and broken parts from over tightening and leakage and part loss from under tightening. Additionally, the present strainers preferably employ a cover lock system which requires two movements to release. This helps the user avoid accidental or unintentional release of the cover. Of course, the present strainers are reliable and effective in use. Moreover, the present strainers have a self cleaning feature which allows more debris to be screened or filtered out before strainer performance is lost.

Overall, the present strainers are compactly and efficiently configured, are effective and reliable in use, and are easy to clean and maintain. The user, for example, boat owner, is provided with a supply of raw sea water free of debris using the present strainers with reduced operating and maintenance requirements.

In general, the present strainers comprise a body, an inlet, an outlet, a cover, and a screen assembly. The body has a closed first end or bottom and an open second end or top and defines a chamber therebetween. Preferably, the chamber has a central axis which intersects both the first and second ends. The inlet includes an inlet passage in fluid communication with this chamber. The inlet includes an inlet passage in fluid communication with the chamber and is designed to allow fluid to pass into the chamber. The outlet, which is spaced apart from the outlet, includes an outlet passage in fluid communication with the chamber. The outlet is configured to provide passage for fluid from the chamber. Preferably, the strainer body includes the inlet and the outlet. Particularly useful is the embodiment in which the inlet and outlet are integrally formed into the body. The cover is sized and adapted to be secured to the body to close the open first end. The screen assembly is positioned in the chamber and is located between the inlet and the outlet.

In one embodiment, the screen assembly is positioned in the chamber at an angle, in particular a less than 90° angle, more preferably at an angle in the range of about 5° to about 30° or about 45°, still more preferably about 5° to about 20°, relative to the central axis. The strainer having an angled screen, as described herein, provides a number of benefits. For example, the strainer can be very effectively used with the body mounted in a substantially flat position, preferably with the inlet and outlet substantially aligned in the same plane as the body. The body is more preferably no more than about 150%, and still more preferably no more than about 130% taller than the largest diameter of the inlet or outlet. This gives the user the option of installing the present strainers in low profile areas, parallel to the boat hull, reducing the required clearance and providing more room for other items. Also, the angled screen, together with a relatively large chamber, facilitates the ability of the present strainers to remove large amounts of debris before strainer performance is adversely affected. Moreover, the present strainers preferably are self-cleaning. Each of these features advantageously increases the time interval between strainer shut downs, for example, to clean debris from the chamber.

In addition, the present strainers preferably use flat, die-cut screens which do not have any welds to rust. This extends the life of the strainers relative to strainers with welds. The present screen assemblies are easily replaced in the field. For example, in an emergency, the screen assembly can be made from many commonly found materials. This feature advantageously allows an added degree of flexibility to the user.

In a particularly useful embodiment, the present strainer includes a basket assembly sized and adapted to be removably placed in the chamber and to carry the screen assembly. This feature allows the basket and screen to be easily removed, for cleaning and maintenance. For example, the strainer is easily disassembled. Thus, with the cover removed, the screen is easily removed by grabbing the edge of the basket and pulling. The body and cover are easily cleaned due to the large open surfaces with no hidden areas that are too small to reach into and clean. The screen is easily cleaned. The flat screen in the basket assembly retains its shape well. The strainer is easily reassembled.

The basket assembly preferably includes a plurality of ribs which contact the screen assembly. Each of these ribs is substantially rounded or pointed, as opposed to being flat or squared, at the area of contact with the screen assembly. Having substantially rounded or pointed ribs increases the active screen area, thereby enhancing the performance and efficiency of the present strainers. More preferably, each of these ribs is substantially pointed at the point of contact with the screen assembly.

In another useful embodiment, the basket assembly includes at least one projection extending away from the screen assembly. The basket assembly contacts the closed first end. The projection is effective to facilitate the initiation of movement of the basket assembly relative to the body when it is desired to remove the basket assembly from the chamber. Preferably, the basket assembly includes two substantially opposing projections extending away from the screen and in contact with the closed first end of the body.

The rocking motion caused by these projections facilitates removal of the screen and basket assemblies from the chamber.

The strainer body preferably includes a first key assembly and the basket assembly includes a second key assembly. The first and second key assemblies are sized and adapted to facilitate orienting the basket assembly in the chamber. This feature enhances the ease of assembling and reassembling the strainer.

The cover preferably includes two substantially opposing radially outwardly extending areas. In this embodiment, the body includes two substantially opposing clamps each of which is sized and adapted to receive a different one of the radially outwardly extending areas to facilitate maintaining the cover secured to the body. These clamps are preferably substantially stationary relative to the remainder of the body. Preferably, each of the radially outwardly extending areas include about 25% or less, for example, about 5% to less than about 25%, of the outer perimeter of the cover. The clamps are preferably structured so that the radially outwardly extending areas can be removed from the clamps by rotating the cover relative to the body through about 25% or less, for example, about 10% to about 20%, of a full revolution. With these outwardly extending areas removed from the clamps, the cover is easily removed from the body. Of course, re-securing the cover to the body is also accomplished by partial rotation of the cover relative to the body. This "small rotation" feature of the present invention allows for removing and re-securing the cover without requiring hand repositioning or tools. The cover can be quickly and easily removed with one hand.

The cover preferably includes at least one radially outwardly extending projection, preferably two substantially opposing radially outwardly extending projections, and the body includes a moveable closure assembly including a recess adapted to receive and hold the outwardly extending projection when the cover is secured to the body. The moveable closure assembly and projection are preferably structured so that an audible sound or "click" is emitted when the projection is received in the recess. The projection/moveable closure assembly feature provides a positive stop, and preferably an audible "click", to alert the user that the cover is secured to the body. This avoids uncertainty and broken parts from over tightening, and breakage and part loss from under tightening.

A particularly useful embodiment is one which has both the radially outwardly extending areas and clamps, and radially outwardly extending projection and closure assembly.

In another embodiment, the cover includes an annular groove, preferably located below the top or upper region of the cover, which is sized and adapted to hold an O-ring. An O-ring is located in this annular groove and is positioned to contact the body when the cover is secured to the body. This groove/O-ring configuration provides an effective seal between the cover and the body. In addition, because of the location of the O-ring, the O-ring is not damaged by removing the cover and is protected against damage while the cover is off the body. Thus, an effective seal can be re-established once the cover is again secured to the body. This combination seal, that is a seal with advantages of both a radial seal and a face seal, is an important feature and provides for increased ease of maintenance of the present strainers.

In a further embodiment, both the closed first end of the body and the cover have inner surfaces at least a portion of each of which is concave. Such concave surfaces decrease the number and height of the reinforcing ribs on the closed first end and cover required to handle pressure inside the strainer. In addition this feature reduces high stress areas and allows the body and cover to be stronger while using less material, for example, polymeric material, per part. The user is provided with a high quality strainer which can be produced at a reduced cost.

The cover preferably includes a central inwardly extending projection which extends toward the screen assembly when the cover is secured to the body. This projection is preferably located on the inlet side of the screen, particularly when a basket assembly is employed. This central projection acts to prevent, or at least reduce, undue movement of the screen assembly during use, for example, at back flow condition, away from the basket assembly and, thus, enhances strainer effectiveness.

Unless one or more of the features of the present strainers are mutually inconsistent with one or more other features, each feature described herein can be used in combination with one or more other of such features. Therefore, strainers which include any one or more features set forth herein are included with the scope of the present invention.

These and other aspects of the present invention are set forth in the following detailed description and claims, particularly when considered in conjunction with the accompanying drawings in which like parts bear like reference numerals.

DETAILED DESCRIPTION OF PREFERRED EMBODIMENTS

Figure 1:
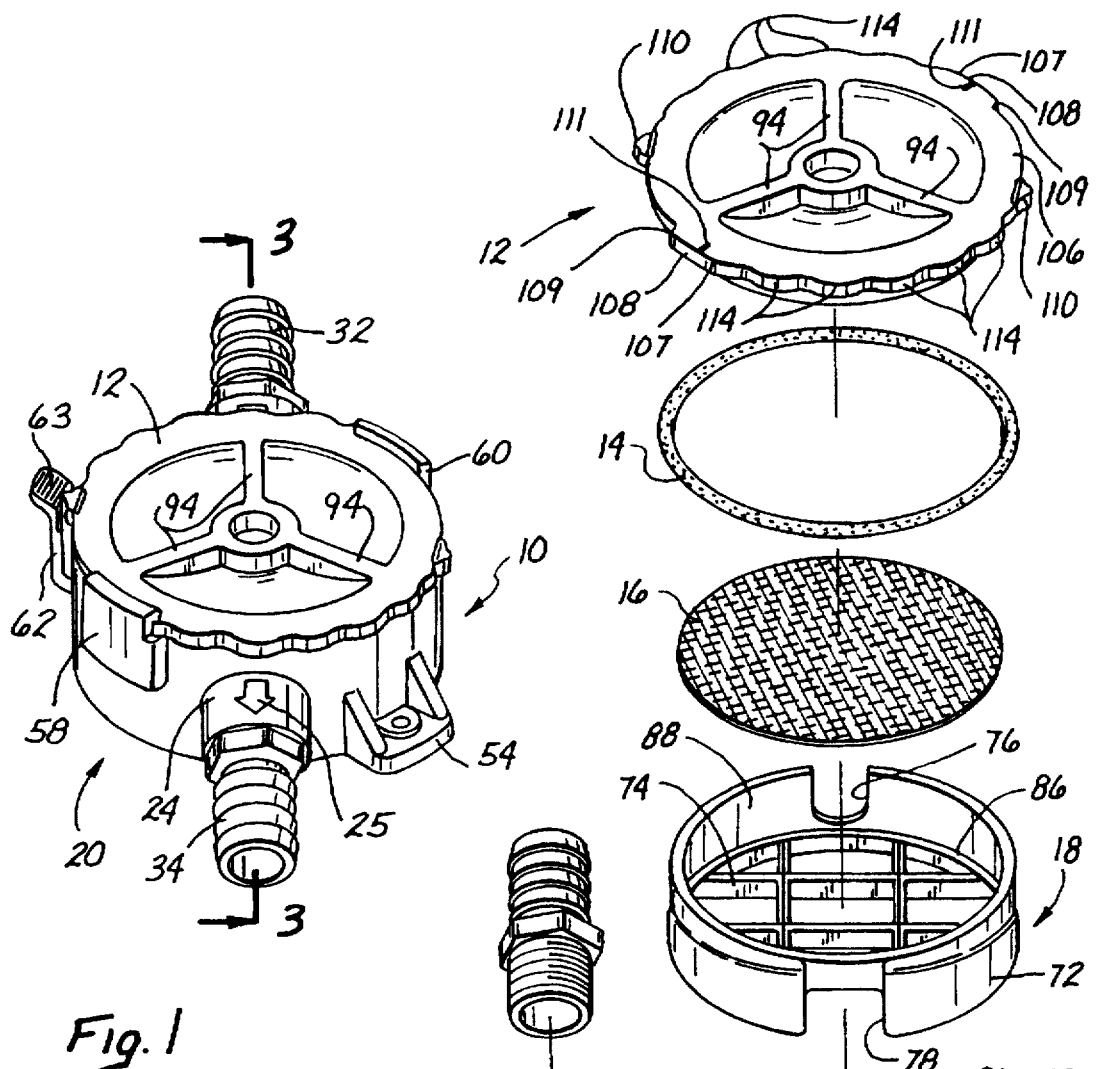
FIG. 1 is a top side view, in perspective, of a strainer in accordance with the present invention.

Referring now to the drawings, a raw water strainer, shown generally at 10, includes a cover 12, an O-ring 14, a flat wire mesh screen 16, a screen basket 18, and a strainer body 20 which includes an integrally formed inlet 22 and an integrally formed outlet 24. Although the components of strainer 10 can be made of any suitable material or combination of materials of construction, it is preferred that the cover 12, screen basket 18 and strainer body 20 be made of a substantially rigid polymeric material, such as polyamides (nylon), acrylonitrile-butadiene-styrene polymers and the like. The screen 16 is made of metal wire, such as stainless steel, having a wire diameter as small as 0.01 inch. The inlet 22 forms an inlet passage 26 which allows fluid, e.g., raw sea water, to flow into the chamber 28 defined by the strainer body 20. The outlet 24 forms an outlet passage 30 which allows fluid to exit the chamber 28. In the embodiment shown, both inlet 22 and outlet 24 are configured as female NPT ports. Using conventional, interchangeable fittings, such as inlet fitting 32 and outlet fitting 34, strainer 10 can be adapted to couple to any raw water system, as desired.

The strainer body 20 has a closed bottom 36, and an upwardly extending, generally circular cylindrical sidewall 38 which terminates at an open top 40. The bottom 36 includes a generally flat peripheral portion 42 and a central portion 44 having an inner surfaces 46 which is concave. Ribs 48 are located on the bottom 36 and act to reinforce the body 20. The combination of the concave central portion 44 and the downwardly extending ribs 48 provides a strong, but lightweight bottom structure.

The inlet 22 and outlet 24 are mutually opposing and are aligned in substantially the same plane. An inlet arrow 23 is located on inlet 22 and an outlet arrow 25 is located on outlet 24. These arrows indicate the direction of fluid flow and facilitate proper installation of strainer 10. In addition, the inlet 22 and outlet 24 have maximum outer diameters which are less than the height of the sidewall 38 of strainer body 20. Strainer 10 has a very low profile when in use. As shown best in FIG. 3, the overall height of assembled strainer 10, from the top surface 50 of cover 12 to the outer surface 52 of bottom 36 is less than about 140% or about 150% of the outer diameters of inlet 22 and outlet 24. This low profile feature allows the strainer 10 to be effectively used in small areas of the boat and/or installed in many different areas of the boat. This adds to the convenience and flexibility of using strainer 10.

Strainer body 20 is an integrally formed, e.g., molded, unit, and includes mutually opposing mounts 54 and 56 which allow the strainer 10 to be mounted in place for use. In addition, strainer body 20 includes oppositely disposed clamps 58 and 60 and movable closure element 62, each of which extend above the open top 40. The functioning of clamps 58 and 60 and closure element 62 are discussed in detail hereinafter.

Figure 4:
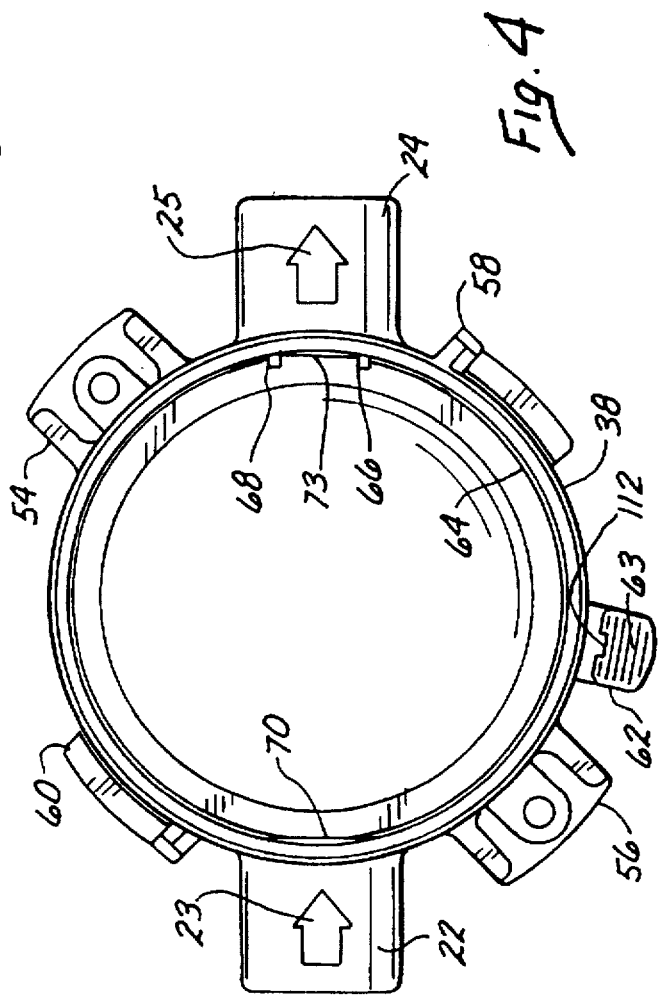
FIG. 4 is a top plan view of the strainer body of the strainer shown in FIG. 1.

With reference to FIG. 4, the inner surface 64 of sidewall 38 includes two spaced apart, inwardly extending keying ribs 66 and 68 which, as will be discussed hereinafter, facilitate the proper deployment of screen basket 18 in chamber 28. In addition, the inner surface 64 adjacent peripheral portion 42 includes a flat region 70 adapted to accommodate a corresponding flat area on screen basket 18. Flat regions 70 and 73 (FIG. 4) extend upwardly from peripheral portion 42, around inlet passage 26 and outlet passage 30, respectively, and terminate above the inlet passage and outlet passage, respectively, to reduce the risk of debris in the raw water bypassing the screen 16 and to aid installation of screen basket 18.

Screen basket 18 includes an outer sidewall 72, a rib grid 74, an inlet opening 76 and an outlet opening 78. Screen basket 18, and in particular outer sidewall 72, is sized to fit snugly into chamber 28 so that the outer sidewall is directly adjacent inner surface 64 of strainer body 20. The lower portion 65 of sidewall 64 extends further inwardly relative to the remainder (upper portion) of the sidewall. The transition 67 between the lower portion 65 and the remainder of sidewall 64 runs at an angle around the body 20, below the inlet passage 26 and above the outlet passage 30. This arrangement allows an increased amount of free clearance when the screen basket 18 is being installed. The snug fit between the strainer body 20 and screen basket 28 reduces the risk of debris in the raw water bypassing the screen 16.

The outlet opening 78 has a generally squared or rectangular configuration which is adapted to receive the keying ribs 66 and 68. On the other hand, the inlet opening 76 is generally rounded and cannot receive the keying ribs 76 and 78. Thus, there is only one way the screen basket 18 fits into strainer body 20 so there is substantially no risk of misassembling strainer 10. In addition, the areas of strainer basket 18 around both inlet opening 76 and outlet opening 78 are flattened which facilitates placing the screen basket 18 into strainer body 20. A slightly enlarged region or counterbore 80 is provided near the open top 40 of strainer body 20 to facilitate placement of the screen body 18 in the chamber 28. The counterbore 80, which is generally circular with no flattened areas, allows the screen basket to be partially inserted in the chamber 28 (to achieve some degree of stability), and then rotated and dropped into proper position. The inner surface 64 of sidewall 38 has flat areas, such as flat region 70, in line with both the inlet 22 and outlet 24 to accommodate flat areas of screen basket 18. Such corresponding flat areas facilitate maintaining the screen basket and strainer body in proper alignment during use of the strainer 10.

The bottom surface 69 of strainer basket 18 includes two mutually opposing rocking nipples 71 (only one shown in FIG. 3) which contact the peripheral portion 42 of bottom 36. Rocking nipples 71 function to facilitate the initiation of movement between the screen basket 18 and the strainer body 20, for example, when it is desired to remove strainer basket 18 from strainer body 20. This feature facilitates rapid and easy disassembly of strainer 10 when such disassembly is desired, for cleaning or maintenance.

Figure 3:
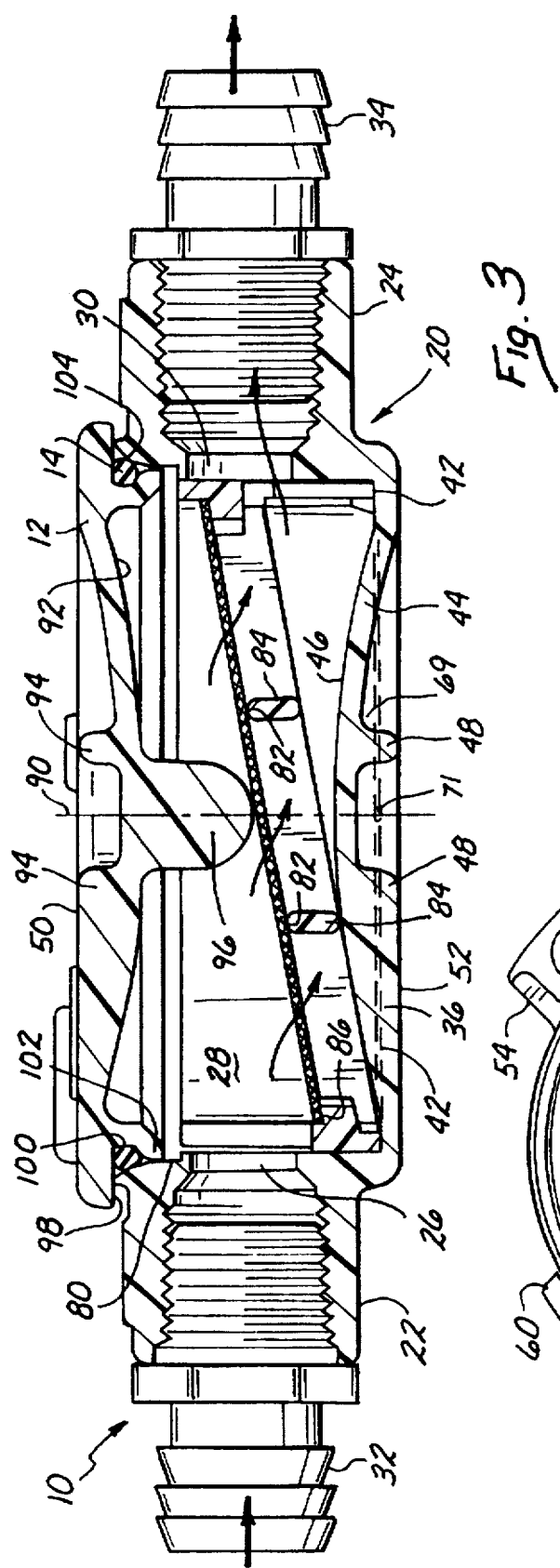
FIG. 3 is a cross-sectional view taken generally along line 3—3 of FIG. 1.

The rib grid 74 is structured to support the screen 16 without unduly reducing the active or effective screen area. For example, as best shown in FIG. 3, the areas 82 of the ribs 84 of rib grid 74 which come into contact with screen 16 are pointed to reduce interference with the active area of the screen. In addition, the rib grid has a solid peripheral region 86 which extends around the entire inner sidewall surface 88 of the screen basket 18. The screen 16 is sized so that it fits well onto peripheral region 86. The screen 16 is pressed tightly around the edge to keep it inside the screen basket 18. This feature reduces the risk of debris in the raw water bypassing the screen 16.

As noted above, the screen 16 is made of metal wire, although other materials may be employed. This screen 16, which is substantially flat, is positioned on the rib grid 74 at an angle of 10° relative to the central axis 90 of stainer body 20. The screen 16 is located between the inlet 22 and the outlet 24. The angled screen 18 provides substantial advantages. For example, the incoming raw water from inlet 22 flows onto the screen 16 and moves or cleans debris from the screen allowing more raw water to be treated or strained before strainer performance is lost. The strainer 10 may be considered to be self cleaning. In one test, a strainer as shown in the drawings handled at least twice as much debris (by weight) as a competitive strainer with the same active screen area before equal vacuum was reached on each strainer. The angled screen 16 allows the strainer 10 to be very effective in the low profile configuration discussed elsewhere herein. In addition, screen 16 is easily replaced, when needed, using materials which are readily available.

The cover 12 is sized and adapted to be secured to strainer body 20 and to cover or close the open top 40 of the strainer body. Cover 12 includes an inner surface 92 which is concave and three reinforcing ribs 94. The concave configuration of inner surface 92 and the reinforcing ribs 94 of cover 12 provide a strong, yet lightweight cover which is able to withstand the pressures that exist in the strainer 10 during use. In addition, cover 12 includes a relatively large downwardly extending projection 96. When the cover 12 is in place, as shown in FIG. 3, projection 96 terminates in proximity to screen 16, although preferably not in contact with the screen in a rest position. Projection 96 acts to reduce the movement of screen 16 when strainer 10 is in use and subjected to a back flow condition.

The underside 98 of cover 12 includes an annular groove 100 which is sized and adapted to receive and hold O-ring 14. Annular ridge 102 of cover 12 facilitates holding O-ring 14 in the groove. When cover 12 is secured to strainer body 20, O-ring 14 is in sealing contact with both groove 100 and surface 104 of the strainer body and, thereby, provides a seal between the cover and the strainer body.

The use of a combination seal, that is a combination radial/face seal, including O-ring 14 allows the cover 12 to be extended over the seal without interfering with it and protects the O-ring from damage when the cover is removed from the strainer body 20. This sealing system assures the protection of the sealing element, that is the O-ring 14, and decreases the chance of strainer failure. The O-ring 14 also urges the cover 12 away from strainer body 20. Thus, when the cover 12 is freed of clamps 58 and 60, as discussed hereinafter, O-ring 14 facilitates easy removal of the cover from the strainer body 20.

Figure 2:
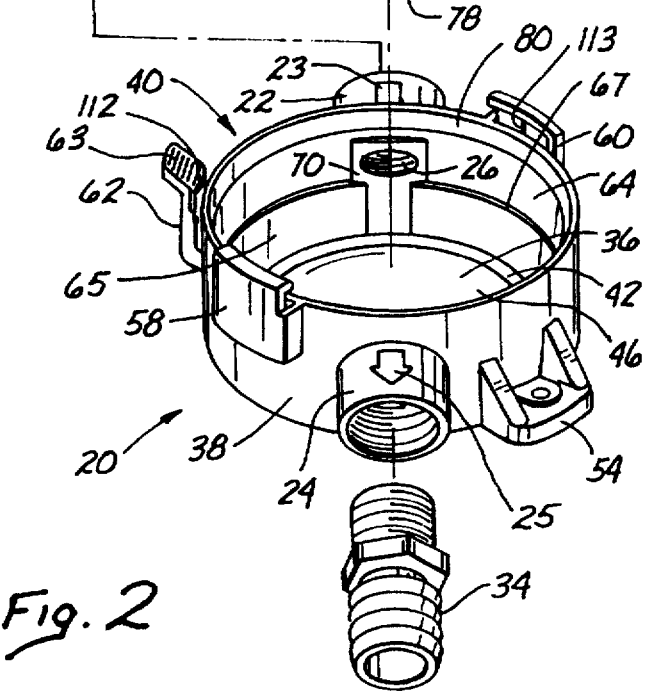
FIG. 2 is an exploded view, in perspective of the strainer shown in FIG. 1, shown disassembled.

The cover 12 includes a perimeter 106 which is generally circular in configuration. This perimeter has two mutually opposing radially outwardly extending areas 108. Each of the areas 108 includes a lead in ramp 109 which extends from the perimeter 106 to the outer surface 107 of the area 108 at an angle of about 45° to assist in passing the areas into the clamps 58 and 60. Each of the areas 108 includes about 20° of the total 360° arc of the generally circular perimeter 106. Radially extending indents 111 are located on areas 108 and engage projections 113 (only one shown in FIG. 2) when the areas are "locked" in place in clamps 58 and 60. Indents 111 engaging projections 113 assist in maintaining cover 12 in place on strainer body 20. In addition, two locking tabs 110 extend radially outwardly from perimeter 106. Each of the tabs 110 is directly opposite the other tab 110. A series of smaller projections 114 are located on perimeter 106 and act as finger grips to allow the cover 12 to be easily rotated by hand.

When it is desired to place cover 12 onto strainer body 20 to close open end 40, the cover is initially placed on strainer body 20 such that the areas 108 and tabs 110 are spaced apart from the clamps 58 and closure element 62. The cover is then rotated so that each of the areas 108 is captured by a clamp 58. This rotation is stopped when a clicking sound is heard. This clicking sound is obtained when one of the tabs 110 is captured by indent 112 located on closure element 62. At this point, the cover 12 is firmly secured to the strainer body 20. The audible clicking noise is a positive indication of the securement of the cover 12 to the stainer body 20. When it is desired to remove the cover 12 from the strainer body 20, the movable closure element 62 is pushed to release the tab 110 from the indent 112. The top surface 63 is slanted outwardly and grooved to facilitate manually pushing closure element 62. In addition, the cover 12 is rotated, relative to the strainer body 20, through a relatively small portion, on the order of 15° to 20° or 25° of a total rotation so that the areas 108 escape the clamps 58 and 60. At this point, the cover 12 can be removed from the strainer body 20, for example, to provide access to the chamber 28 for cleaning or maintenance.

The present strainer 10 is easy to disassemble. The screen 16 is easily removed by grabbing the edge of the screen basket 18 and pulling. The strainer body 20 and cover 12 are easily cleaned due to the large open surfaces with no hidden surfaces that are too small to reach into and clean. The relatively large size of chamber 28 facilitates cleaning and provides space for debris to collect so that larger amounts of raw water can be handled between strainer cleanings. The screen 16 is easily cleaned. The flat screen 16 in strainer basket 18 retains its shape well. The strainer 10 is easily reassembled. All of these features increase user convenience and satisfaction.

The present strainers have straightforward parts which are relatively easy and inexpensive to manufacture. In addition, the present strainer has a reduced number of parts which facilitates ease of assembly and maintenance.

While this invention has been described with respect to various specific examples and embodiments, it is to be understood that the invention is not limited thereto and that it can be variously practiced within the scope of the following claims.

What is claimed is:

1. A strainer comprising:

a body having a closed first end and an open second end and defining a chamber therebetween, said chamber having a central axis intersecting said first end and said second end;

an inlet including an inlet passage in fluid communication with said chamber;

an outlet, spaced apart from said inlet, including an outlet passage in fluid communication with said chamber;

a cover sized and adapted to be secured to said body to close said second end;

a screen having a first substantially flat side and an opposing second substantially flat side, said sides being positioned in said chamber at an angle less than 90° relative to said central axis and between said inlet and said outlet; and a basket assembly sized and adapted to be removably located in said chamber and said screen is supported within said basket assembly, said basket assembly has an inlet opening and an outlet opening and a solid sidewall extending from said inlet opening to said outlet opening.

2. The strainer of claim 1 wherein said inlet and said outlet are substantially aligned and the angle is about 45° or less.

3. The strainer of claim 1 wherein both said closed first end and said cover have inner surfaces, and at least a portion of each said inner surfaces is concave.

4. The strainer of claim 1 wherein said strainer and said outlet each has a maximum outer dimension parallel to said central axis and the maximum outer dimension of said strainer parallel to said central axis is less than 150% of the maximum outer dimension of said outlet parallel to said central axis.

5. The stainer of claim 1 wherein said basket assembly includes at least one projection extending away from said screen assembly and in contact with said closed first end, said projection being effective to facilitate the initiation of movement of said basket assembly relative to said body when it is desired to remove said basket assembly from said chamber.

6. The strainer of claim 1 wherein said body includes a first key assembly and said basket assembly includes a second key assembly, said first and second key assemblies being sized and adapted to facilitate orienting said basket assembly in said chamber.

7. The strainer of claim 1 wherein said cover includes two substantially opposing radially outwardly extending areas, and said body includes two substantially opposing clamps each of which is sized and adapted to receive a different one of said radially outwardly extending areas to facilitate maintaining said cover secured to said body.

8. The strainer of claim 7 wherein said cover includes an outer perimeter and each of said radially outwardly extending areas include about 25% or less of said outer perimeter, and said clamps are structured so that said radially outwardly extending areas can be removed from said clamps by rotating said cover relative to said body through about 25% or less of a full rotation.

9. The strainer of claim 1 wherein said cover includes at least one radially outwardly extending projection and said body includes a movable closure assembly including a recess adapted to receive and hold said outwardly extending projection when said cover is secured to said body.

10. The strainer of claim 9 wherein said cover includes two substantially opposing radially outwardly extending areas, and said body includes two substantially opposing clamps each of which is stationary relative to said body, and is sized and adapted to receive a different one of said radially outwardly extending areas to facilitate maintaining said cover secured to said body.

11. The strainer of claim 1 wherein said cover includes an annular groove sized and adapted to receive and hold an O-ring, and an O-ring located in said annular groove and positioned to contact said body when said cover is secured to said body to provide a seal between said cover and said body.

12. A strainer comprising:
a body having a closed first end and an open second end and defining a chamber therebetween, said chamber having a central axis intersecting said first end and said second end;
an inlet including an inlet passage in fluid communication with said chamber;
an outlet, spaced apart from said inlet, including an outlet passage in fluid communication with said chamber, said inlet and said outlet being substantially aligned, said strainer and said outlet each has a maximum outer dimension parallel to said central axis and the maximum outer dimension of said strainer parallel to said central axis is less than 150% of the maximum outer dimension of said outlet parallel to said central axis;
a cover sized and adapted to be secured to said body to close said second end; a screen assembly having first and second sides positioned in said chamber at an angle less than 90° relative to said central axis and between said inlet and said outlet; and
said cover includes two substantially opposing radially outwardly extending areas and an outer perimeter, and said body includes two substantially opposing clamps each of which is stationary relative to said body, and is sized and adapted to receive a different one of said radially outwardly extending areas to facilitate maintaining said cover secured to said body, each of said radially outwardly extending areas includes about 25% or less of said outer perimeter, and said clamps are structured so that said radially outwardly extending areas can be removed from said clamps by rotating said cover relative to said body through about 25% or less of a full rotation, and said cover further includes at least one radially outwardly extending projection and said body includes a movable closure assembly including a recess adapted to receive and hold said outwardly extending projection when said cover is secured to said body.

13. The strainer of claim 12 wherein said body includes said inlet and said outlet and the angle is about 45° or less.

14. A strainer comprising:
a body having a closed first end, an open second end and a sidewall and defining a chamber therebetween, said sidewall having an outer surface;
an inlet including an inlet passage in fluid communication with said chamber;
an outlet, spaced apart from said inlet, including an outlet passage in fluid communication with said chamber;
a cover sized and adapted to be secured to said body to close said open second end;
a screen assembly having first and second sides positioned in said chamber between said inlet and said outlet;
said cover includes two substantially opposing radially outwardly extending areas, and said body includes two substantially opposing clamps extending from said outer surface of said sidewall, each of said clamps sized and adapted to receive a different one of said radially extending areas to facilitate maintaining said cover secured to said body; and
said cover includes an outer perimeter and each of said radially outwardly extending areas include about 25% or less of said outer perimeter, and said clamps are structured so that said radially outwardly extending areas can be removed from said clamps by rotating said cover relative to said body through about 25% or less of a full rotation, and said cover further includes at least one radially outwardly extending projection and said body includes a movable closure assembly including a recess adapted to receive and hold said radially outwardly extending projection when said cover is secured to said body.

15. The strainer of claim 14 wherein said clamps are stationary relative to said body.

16. A strainer comprising:
a body having a closed first end and an open second end and defining a chamber therebetween;
an inlet including an inlet passage in fluid communication with said chamber;
an outlet, spaced apart from said inlet, including an outlet passage in fluid communication with said chamber;
a cover sized and adapted to be secured to said body to close said open second end;
a screen assembly having first and second sides positioned in said chamber between said inlet and said outlet; and
said cover includes two substantially opposing radially outwardly extending areas and a radially outwardly extending projection, and said body includes two substantially opposing clamps each of which is sized and adapted to receive a different one of said radially extending areas to facilitate maintaining said cover secured to said body, and a movable closure assembly including a recess adapted to receive and hold said outwardly extending projection when said cover is secured to said body.

* * * * *

UNITED STATES PATENT AND TRADEMARK OFFICE
CERTIFICATE OF CORRECTION

PATENT NO. : 5,800,702
DATED : September 1, 1998
INVENTOR(S) : Taylor-McCune et al It is certified that error appears in the above-identified patent and that said Letters Patent is hereby corrected as shown below:

Column 1, line 65; delete "outlet, includes an outlet: and insert in place thereof --inlet, includes an outlet--.

Claim 12, line 37; after "end;" start new paragraph.

Signed and Sealed this

Eighth Day of May, 2001

Attest:

NICHOLAS P. GODICI

Attesting Officer    Acting Director of the United States Patent and Trademark Office